US007937948B2

(12) United States Patent
Zubrin et al.

(10) Patent No.: US 7,937,948 B2
(45) Date of Patent: May 10, 2011

(54) SYSTEMS AND METHODS FOR GENERATING ELECTRICITY FROM CARBONACEOUS MATERIAL WITH SUBSTANTIALLY NO CARBON DIOXIDE EMISSIONS

(75) Inventors: Robert M. Zubrin, Indian Hills, CO (US); Mark H. Berggren, Golden, CO (US)

(73) Assignee: Pioneer Energy, Inc., Lakewood, CO (US)

( * ) Notice: Subject to any disclaimer, the term of this patent is extended or adjusted under 35 U.S.C. 154(b) by 133 days.

(21) Appl. No.: 12/565,308

(22) Filed: Sep. 23, 2009

(65) Prior Publication Data

US 2011/0067410 A1 Mar. 24, 2011

(51) Int. Cl.
*F02C 6/18* (2006.01)
(52) U.S. Cl. ...................... 60/780; 60/39.182
(58) Field of Classification Search ............ 60/39.12, 60/39.182, 39.5, 780, 781; 55/342, 342.1; 48/61, 197 R; 166/268, 402
See application file for complete search history.

(56) References Cited

U.S. PATENT DOCUMENTS

| | | | | |
|---|---|---|---|---|
| 494,647 A * | 4/1893 | Perka et al. | ............ | 202/168 |
| 5,069,685 A * | 12/1991 | Bissett et al. | ............ | 48/77 |
| 6,032,456 A * | 3/2000 | Easom et al. | ............ | 60/793 |
| 7,272,934 B2 * | 9/2007 | Chandran et al. | ............ | 60/781 |
| 2005/0039400 A1 * | 2/2005 | Lau et al. | ............ | 48/198.3 |
| 2009/0158701 A1 * | 6/2009 | Hoffmann et al. | ............ | 60/39.12 |
| 2009/0236093 A1 * | 9/2009 | Zubrin et al. | ............ | 166/268 |
| 2010/0038082 A1 * | 2/2010 | Zubrin et al. | ............ | 166/268 |
| 2010/0314136 A1 * | 12/2010 | Zubrin et al. | ............ | 166/402 |
| 2011/0014088 A1 * | 1/2011 | Zubrin et al. | ............ | 422/105 |

* cited by examiner

*Primary Examiner* — Michael Cuff
*Assistant Examiner* — Phutthiwat Wongwian
(74) *Attorney, Agent, or Firm* — American Patent Agency; Daniar Hussain; Albert Ho

(57) ABSTRACT

A reformation power plant generates clean electricity from carbonaceous material and high pressure $CO_2$ which can be easily sequestered or utilized for a beneficial purpose, such as fuel production. The reformation power plant design utilizes a reformation process that reforms carbonaceous fuel with super-heated steam into a high-pressure gaseous mixture that is rich in carbon dioxide and hydrogen gas. This high-pressure gas exchanges excess heat with the incoming steam from a boiler and continues onward to a condenser. Once cooled, the high-pressure gas goes through a methanol separator, after which the $CO_2$-rich gas is sequestered underground or beneficially re-used. The remaining hydrogen-rich gas is combusted through a gas turbine. The gas turbine provides power to a generator and also regenerative heat for the boiler. Finally, the generator converts mechanical energy into electricity, which is transferred to the electric grid. Therefore, carbon-free electricity is generated from coal, biomass, or other carbon-based feedstock.

20 Claims, 8 Drawing Sheets

Fixed Bed Reformer

SYSTEMS AND METHODS FOR GENERATING ELECTRICITY FROM CARBONACEOUS MATERIAL WITH SUBSTANTIALLY NO CARBON DIOXIDE EMISSIONS

REFERENCE TO RELATED APPLICATIONS

This application is related to U.S. Ser. No. 12/496,456 entitled "A PORTABLE RENEWABLE ENERGY SYSTEM FOR ENHANCED OIL RECOVERY (PRESEOR) USING BIOMASS HAVING NET NEGATIVE $CO_2$ EMISSIONS AND FOR GENERATING ELECTRICITY HAVING ZERO $CO_2$ EMISSIONS," filed on Jul. 1, 2009, the entirety of which is hereby incorporated by reference herein.

FIELD OF THE INVENTION

This invention relates to a system and method for generating "green electricity" having substantially zero or very low $CO_2$ emissions from a carbonaceous feedstock. One embodiment of the present invention is a power plant which utilizes a steam reforming process that may be used to generate electricity, hydrogen, and high pressure carbon dioxide-rich gas, which may be either sequestered or utilized for a beneficial purpose (such as fuel production).

BACKGROUND OF THE INVENTION

The world's power demands are expected to rise 60% by 2030. With the worldwide total of active coal plants over 50,000 and rising, the International Energy Agency (IEA) estimates that fossil fuels will account for 85% of the energy market by 2030.

World organizations and international agencies like the IEA are concerned about the environmental impact of burning fossil fuels, and coal in particular. Electricity generation using carbon-based fuels is responsible for a large fraction of carbon dioxide ($CO_2$) emissions worldwide; and for 41% of U.S. man-made carbon dioxide emissions.

Increased concentration of carbon dioxide in the atmosphere assist climate change including global warming; concern over the rate of climate change has led to targets to stabilize or reduce carbon dioxide and other greenhouse gas (GHG) emissions by between 25 and 40% by 2020. Fossil fueled, especially coal-fired, plants make reductions difficult. Emissions may be reduced through more efficient and higher combustion temperature and through more efficient production of electricity within the cycle. Carbon capture and storage (CCS) of emissions from coal-fired power stations is another alternative but the technology is still being developed and will increase the cost of fossil fuel-based production of electricity using existing technologies. Existing CCS technologies may not be economically viable, unless the price of emitting $CO_2$ to the atmosphere rises. (Portions cited from Wikipedia.org).

The inventors have recognized a unique solution to the above mentioned issues as well other problems and difficulties associated with carbon capture from prior art power plants. Accordingly, the inventors have devised the present invention which allows generating clean electric power from carbonaceous material such as coal, biomass, etc. If biomass is used, the present invention actually reduces $CO_2$ from the atmosphere.

It is against this background that various embodiments of the present invention were developed.

BRIEF SUMMARY OF THE INVENTION

Accordingly, one embodiment of the present invention is a power plant for generating electricity having substantially low carbon dioxide emissions, made up of the following components: A boiler is used to generate steam from water. A steam reformer is used to react a carbonaceous material with steam at high-pressure in an absence of air to generate a high-pressure gas comprising primarily carbon dioxide and hydrogen gas, where sufficient water is provided to ensure a substantial majority of the carbonaceous material is converted into carbon dioxide and hydrogen. A $CO_2$ separator is used to separate at high-pressure at least a portion of the carbon dioxide gas from the rest of the high-pressure gas to generate a carbon dioxide-rich gas and also a hydrogen-rich fuel gas.

The hydrogen-rich fuel gas is used to generate electricity using, for example, a gas turbine or fuel cell. Waste heat from the gas turbine or fuel cell may be used to provide heat needed to boil water in the boiler. The high pressure carbon dioxide gas is then sequestered or utilized in an industrial process, thereby generating electricity with substantially low carbon dioxide emissions.

Yet another embodiment of the present invention is the apparatus described above where the carbonaceous material is coal, biomass, natural gas, crude petroleum, ethanol, methanol, and/or trash, and/or mixtures thereof.

Yet another embodiment of the present invention is the apparatus described above, where the electricity generated has substantially less associated carbon dioxide emissions than electricity generated from combustion of natural gas. Yet another embodiment of the present invention is the apparatus described above, where an amount of carbon dioxide released in the industrial process is less than an amount of carbon dioxide sequestered or utilized in the industrial process.

Yet another embodiment of the present invention is the apparatus described above, where the high pressure gas also includes carbon monoxide, and where the apparatus also includes a water-gas shift reactor disposed downstream of the steam reformer for converting residual carbon monoxide into additional carbon dioxide and additional hydrogen.

Yet another embodiment of the present invention is the apparatus described above, also including a methanation reactor disposed downstream of the steam reformer for converting residual carbon monoxide into methane.

Yet another embodiment of the present invention is the apparatus described above, also including a furnace adapted to utilize a portion of the hydrogen-rich fuel gas to generate heat to drive the steam reformer.

Yet another embodiment of the present invention is the apparatus described above, also including a heat exchanger disposed between the boiler and the steam reformer adapted to exchange heat between the hot high-pressure gas exiting the steam reformer and the steam entering the steam reformer from the boiler. Yet another embodiment of the present invention is the apparatus described above, also including a heat exchanger disposed between the boiler and the furnace adapted to exchange heat between the hot gas exiting the furnace and the steam being heated by the boiler.

Yet another embodiment of the present invention is the apparatus described above, also including a condenser disposed after the heat exchanger adapted to cool high-pressure gas entering the $CO_2$ separator from the heat exchanger.

Yet another embodiment of the present invention is the apparatus described above, also including a compressor adapted to compress the carbon dioxide-rich gas to a pressure appropriate for injection into a petroleum reservoir to extract oil or natural gas.

Yet another embodiment of the present invention is the apparatus described above, where the steam reformer operates at a pressure of approximately 5 bar to 100 bar.

Yet another embodiment of the present invention is the apparatus described above, where the $CO_2$ separator is a methanol-based separator. Yet another embodiment of the present invention is the apparatus described above, where the methanol-based separator operates in a temperature-swing cycle between approximately −60° C. and +40° C.

Yet another embodiment of the present invention is the apparatus described above, also including a control system adapted to control an operation of the apparatus based on a market price of the carbonaceous material, a market price of electricity, and a market price of a product of the industrial process.

Yet another embodiment of the present invention is the apparatus described above, where the steam reformer is a fixed bed reformer, a fluidized bed reformer, or an entrained-flow reformer.

Yet another embodiment of the present invention is the apparatus described above, where the industrial process is fuel production.

Yet another embodiment of the present invention is the apparatus described above, where the industrial process is growing algae or growing plants in greenhouses.

Yet another embodiment of the present invention is the apparatus described above, where the industrial process is carbon sequestration in a saline aquifer, depleted oil field, depleted gas field, unmineable coal seam, or ocean sequestration.

Yet another embodiment of the present invention is the apparatus described above, where the boiler operates at a temperature of approximately 150° C. to 250° C.

Yet another embodiment of the present invention is the apparatus described above, where the steam reformer operates at a temperature of approximately 600° C. to 1000° C.

Yet another embodiment of the present invention is the apparatus described above, where the hydrogen-rich fuel gas further comprises methane. Yet another embodiment of the present invention is the apparatus described above, where the hydrogen-rich fuel gas further comprises carbon monoxide.

Yet another embodiment of the present invention is the apparatus described above, where the carbon dioxide-rich driver gas is at least 70% $CO_2$ by weight. More preferred embodiments include the apparatus described above, where the carbon dioxide-rich driver gas is at least 90% $CO_2$ by weight, and even more preferably at least 97% $CO_2$ by weight.

Another embodiment of the present invention is a method for generating electricity from carbonaceous material having low carbon emissions. A quantity of carbonaceous material is steam reformed at high pressure with water in an absence of air to generate high pressure gas comprising a mixture of hydrogen gas and carbon dioxide gas, where sufficient water is provided to ensure a substantial majority of the carbonaceous material is converted into carbon dioxide and hydrogen. The high pressure gas is separated using a high-pressure $CO_2$ separation process into a carbon dioxide-rich gas and a hydrogen-rich fuel gas. The carbon dioxide gas stream is sequestered or utilized in an industrial process, while electric power is generated using a portion of the separated hydrogen-rich fuel gas. Therefore, since the $CO_2$ is either sequestered or beneficially utilized, the electric power is generated with little or no carbon dioxide emissions into the atmosphere.

Other features, utilities and advantages of the various embodiments of the invention will be apparent from the following more particular description of embodiments of the invention as illustrated in the accompanying drawings.

DETAILED DESCRIPTION OF THE INVENTION

Figure 1:
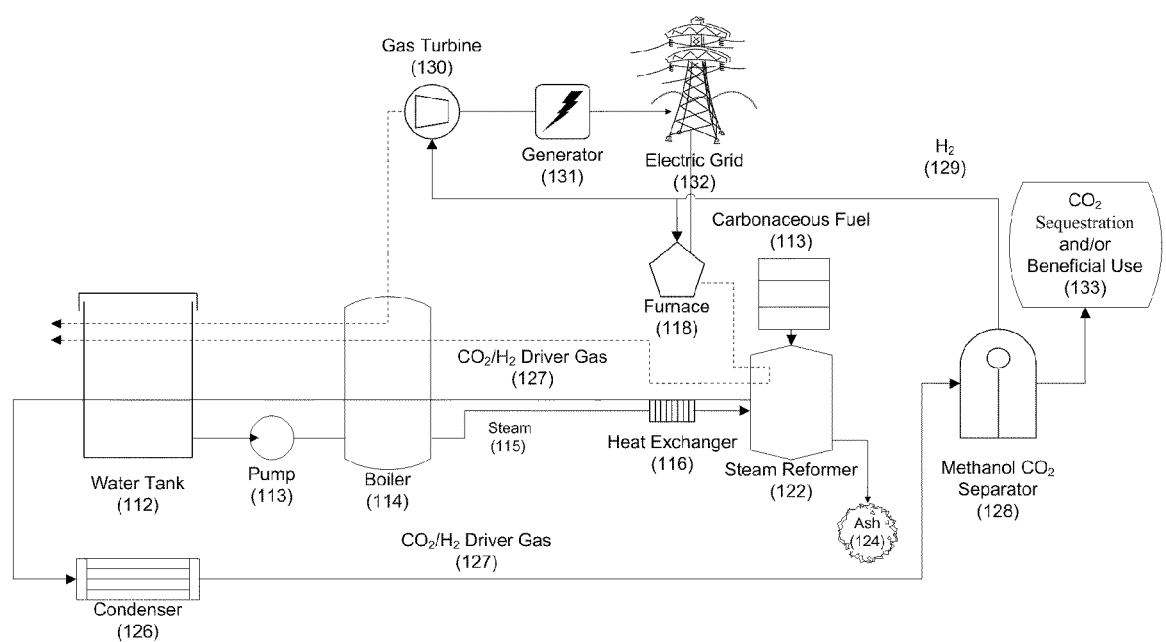
FIG. 1 illustrates an example of an embodiment of a power plant according to the present invention for the reformation of super-heated high-pressure steam with carbonaceous material to create a gaseous mixture rich in hydrogen and carbon dioxide gas in which the hydrogen combusts in a gas turbine for electricity generation while the carbon dioxide gas remains stored using sequestration and/or beneficial use.

This innovative plant design utilizes efficient reformation of carbonaceous fuel and steam to improve upon traditional combustion methods of fuel and air which currently dominate the power generation industry. The reformation of carbonaceous fuel allows power plants to contribute to the hydrogen economy by producing hydrogen for less energy than it takes to create it. This design also allows for sequestration and/or beneficial use of $CO_2$ for a variety of applications such as the recovery of otherwise inaccessible oil, fire extinguishers, welding, pneumatic systems, biological applications, and chemical processing.

The hydrogen is either burned to produce clean electricity, to be sold to utilities or used for other uses such as a chemical production, fuel cell application, or enhanced oil recovery, depending on which of these methods produce higher monetary value to the operator.

If biomass is used as the fuel source, as a result of the fact that the $CO_2$ injected into the ground comes from biomass, whose carbon came from the atmosphere, the electricity generation process of the power plant design not only produces power without emission of $CO_2$ into the environment, it actually reduces atmospheric $CO_2$. In fact, in one embodiment, the amount of carbon sequestered in the process may be on average about 5-30%, and preferably 20-30%, greater than the amount of carbon in the oil recovered. Thus, not only the electricity, but even the oil produced by the enhanced oil recovery process can be said to be truly "green," since it has been fully paid for by the carbon sequestered to get it.

Throughout this disclosure, the symbol "kcf" shall stand for "thousand standard cubic feet," usually of $CO_2$ unless explicitly stated otherwise. The symbol "MMcf" shall stand for "million standard cubic feet," usually of $CO_2$ unless explicitly stated otherwise. That is, a reformer that produces 1 kcf/day of driver gas produces 1,000 standard cubic feet of driver gas per day, while a reformer that produces 1 MMcf/day of driver gas produces 1,000,000 standard cubic feet of driver gas per day. The word "day" shall mean "a day of operations," which could be an 8-hour day, a 12-hour day, a 24-hour day, or some other amount of time. Please note that other sources may use different symbols, such as "mcf" for "thousand cubic feet" based on the Roman numeral "M" for thousand, and care should be taken in terminology when consulting such sources.

Steam Reforming of Biomass and $H_2$ Used to Generate Electricity

One of many illustrative scenarios is presented here to demonstrate the potential profitability of the reformation power plant design. In this scenario, biomass is used as the carbonaceous material feedstock; the $CO_2$ produced is used for EOR, while all of the hydrogen is used for power generation.

Steam reformation of biomass occurs approximately in accord with the following reaction:

$$C_4H_6O_3+5H_2O=>4CO_2+8H_2 \ \Delta H=+118 \text{ kcal/mole} \quad (1)$$

If two of the hydrogen molecules are burned to provide process heat, 114 kcal of energy can be released. So the burning of two moles of hydrogen can drive 1 unit of reactions (1) for a net reaction of:

$$C_4H_6O_3+3H_2O+O_2=>4CO_2+6H_2 \ \Delta H=+4 \text{ kcal/mole} \quad (2)$$

Reaction (2) is essentially energy neutral. While the oxygen used in reaction (2) could be injected directly into the steam reformation reactor, this would either require expensive oxygen separation technology, or compressing air into the ~10 bar steam reformation system, which involves high energy costs and also dilutes the $CO_2$ product with large amounts of nitrogen. Such nitrogen diluent makes subsequent $CO_2$ separation difficult for sequestration, and so if underground $CO_2$ sequestration is desired, such autothermal approaches are disadvantageous. Therefore, in the preferred reformation system, reaction (1) is driven by an external gas-fired furnace deriving its energy from hydrogen combustion which is fueled by utilizing ¼$^{th}$ of the hydrogen produced by reaction (1).

Compared to air or oxygen blow gasification, the reformation system design offers the critical advantages that it yields a high pressure gas mixture that is ⅓ $CO_2$ by mole, with no nitrogen present, and no need to separate oxygen or compress air. Indeed, the only compression work required to feed a high pressure steam reformation system is the very small amount needed to bring liquid water up to an elevated pressure prior to boiling. Such high pressure, high concentration $CO_2$ is much easier to separate from the other exhaust gases than the low pressure, low concentration $CO_2$ present in gasifier or conventional combustion flue gas exhaust, and thus, if a system is to be designed for the primary purpose of securing $CO_2$ for sequestration, this is the preferred system design option.

If the steam reformation is carried out completely in accord with reaction (1), it will produce a gas mixture that is 33% $CO_2$. This concentration can be reduced somewhat by reverse water-gas-shift side reactions that may occur, i.e.:

$$CO_2+H_2=>CO+H_2O \ \Delta H=+9 \text{ kcal/mole} \quad (3)$$

Or increased as a result of methanation side reactions:

$$CO_2+4H_2=>CH_4+2H_2O \ \Delta H=-41 \text{ kcal/mole} \quad (4)$$

However, on net, a $CO_2$ concentration (in the gas after water knockout) over 30% can be achieved. This $CO_2$ concentration is much higher than that available in combustion flue gas, and is very favorable for $CO_2$ separation.

Reaction (3) is undesirable, but it has a low equilibrium constant (~0.1 at 400° C.) and can be nearly entirely suppressed by running the system steam rich. Reaction (4) is a mixed blessing and curse. While it removes $CO_2$, it actually increases the fraction of $CO_2$ in the exhaust (by removing 4 hydrogen molecules for every one $CO_2$ that is removed), making efficient separation easier. The methane it produces also adds to the volumetric energy content of the hydrogen-rich fuel, which enhances electricity production. Furthermore, since reaction (4) is exothermic, it can substantially reduce further the amount of hydrogen that needs to be burned in the furnace to help drive reaction (1). While it has a high equilibrium constant (~10$^6$), it can be mostly suppressed in favor of reaction (1) by running the system steam rich. Assuming, however, that one in four $CO_2$ molecules produced by reaction (1) is consumed by reaction (4), and we use the extra energy to cut the hydrogen furnace fuel requirement, we obtain a net reaction:

$$C_4H_6O_3+2H_2O+\tfrac{1}{2}O_2=>3CO_2+CH_4+3H_2 \ \Delta H=+18 \text{ kcal/mole} \quad (5)$$

Reaction (5) is endothermic, but only to a mild degree, so it can be driven forward by superheating the input steam in the furnace.

The part of reaction (5) occurring in the steam reformer alone is:

$$C_4H_6O_3+3H_2O=>3CO_2+CH_4+4H_2 \ \Delta H=+75 \text{ kcal/mole} \quad (6)$$

It will be observed that the $CO_2$ fraction of the steam reformer exhaust gas has risen to 43%.

Reaction (6) is best done at moderate to high pressure, with 10 bar being adequate to get good results. Since the only gas that needs to be fed to the system is steam, which is derived from water which is initially pressured in the liquid phase, the required compression energy is minimal. Running reaction (6) at high pressure also has the advantage of producing high pressure exhaust gas, which simplifies the task of separating the $CO_2$ from the other product gases. In addition, the presence of moderate to high-pressure high-temperature steam in the reactor acts to suppress coking and to destroy tars and oils emitted from the carbonaceous fuel.

Let us consider the economics of a reformer power plant near an oil field. Depending on the field, it takes between 5,000 and 10,000 cubic feet of $CO_2$ to produce 1 barrel of oil. We adopt the more conservative number of 10,000 cubic feet/bbl. In that case, it will take 560 metric tons of $CO_2$ per day to produce 1,000 barrels per day of oil. Examining reaction (6), we see that 3 $CO_2$ molecules with a total molecular weight of 132 are produced for every unit of biomass with a molecular weight of 102, for a wither ratio of about 1.3. Thus producing 560 metric tons of $CO_2$ will require 430 tons of biomass. Currently, corn stover can be obtained for about $40 per ton, delivered cost, within 50 miles. Thus 430 tons of corn stover would go for a cost of about $17,200. Other forms of crop or forestry residues, or even coal, could potentially be obtained much cheaper, depending upon the locality, but we will use commercially priced corn stover in our analysis to be conservative. This would allow the production of 1,000 barrels of oil, which at a price of $60/bbl, would be worth $60,000.

However, in addition to the oil product, the system also produces electricity. At the same time that 560 metric tons of $CO_2$ are produced, it also produces 68 tons of methane and 25.4 tons of hydrogen. If burned in air, these will produce 2,000 MWt-hours of energy. Assuming 30% efficiency, this translates into 600 MWe-hours of power, which at a price of $0.05/kWh, would sell for $30,000. The power output of the system would be 25 MWe, which is well within the range of many gas turbine units produced by industry. It may be further noted that the revenue from electricity alone significantly exceeds the cost of feedstock (and other daily costs, outlined below).

Adding the $30,000 per day revenue from electricity to the $60,000 earned from oil, we see that a total gross income of $90,000 per day can be obtained at a cost of $17,200 in feedstock. Assuming labor costs of $8000 per day and capital and depreciation costs of $8,200 per day (assuming a per unit capital cost of $30 million, paid off at 10% per year), total daily operating costs would be $33,400. Thus the net profit of the operation would be $36,600 per day, or about $13.6 million per year.

Therefore, using the principles taught by the present invention, profitable hydrogen production and clean electricity production may become economically feasible.

Preferred System Block Diagram

FIG. 1 shows a block diagram of a preferred embodiment of a reformer power plant system 100. Water from water tank 112 is compressed in a pump 113 into boiler 114, where it is boiled and brought to 200° C. The steam 115 then passes through heat exchanger 116, where heat from exiting hot gas pre-heats the steam 115 and cools the exiting gas, increasing the overall efficiency of the system 101. Carbonaceous fuel 113 and hot steam 115 enter steam reformer 122, which operates at approximately 850° C. and 10 bar. Ash is collected in ash tray 124, from the bottom of the steam reformer 122. The heat to drive steam reformer 122 is provided by furnace 118, which is fueled by hydrogen gas. Exiting high pressure gas passes through heat exchanger 116, pre-heating the steam 115 from boiler 114. The exiting high pressure gas passes around boiler 114 and water tank 112, further releasing heat to these elements. Finally, exiting driver gas 127 is passed through condenser 126, before being fed to methanol $CO_2$ separator 128, the operation of which is described in greater detail below. The high pressure gas is composed primarily of carbon dioxide and hydrogen gas, but may also include methane gas and carbon monoxide gas, as well as possibly other gases. The methanol $CO_2$ separator 128 produces a $CO_2$ gas stream 133 comprised essentially of $CO_2$, and a fuel stream 129 comprised primarily of hydrogen, but also methane, carbon monoxide, and possibly other gases. The fuel gas stream 129 is fed into gas turbine 130, as well as furnace 118. Gas turbine 130 produces electricity 132 via generator 131, which may be used locally or fed to the grid 132. Furnace 118 burns a portion of the fuel gas in order to generate the heat necessary to drive the reforming reaction taking place in the steam reformer 122.

The high-pressure gas may also include residual carbon monoxide, and a water gas-shift reactor (not shown in FIG. 1) may be disposed downstream of the steam reformer for converting the residual carbon monoxide into additional carbon dioxide gas and additional hydrogen gas. Alternatively, a methanation reactor (not shown in FIG. 1) may be disposed downstream of the steam reformer for converting the residual carbon monoxide into methane. As noted previously, the high-pressure gas may also include residual methane, which is advantageous, since it makes it easier to combust the hydrogen gas in the gas turbine.

The boiler 114 may operate at a temperature of approximately 150° C. to 250° C.

The steam reformer 122 may operate at a temperature of approximately 600° C. to 1000° C., and a pressure of approximately 5 bar to 100 bar. The steam reformer may be a fixed bed reformer, a fluidized bed reformer, or an entrained-flow reformer, or another steam reformer design known in the art.

The methanol $CO_2$ separator 128 may operate in a temperature-swing cycle between approximately −60° C. and +40° C.

The apparatus may also include a control system adapted to control an operation of the apparatus based on a market price of carbonaceous material, a market price of electricity, and a market price of crude petroleum (as described in greater detail below).

The carbon dioxide-rich driver gas is preferably at least 70% $CO_2$ by weight, but more preferable at least 90% $CO_2$ by weight, and even more preferably at least 97% $CO_2$ by weight.

Figure 2:
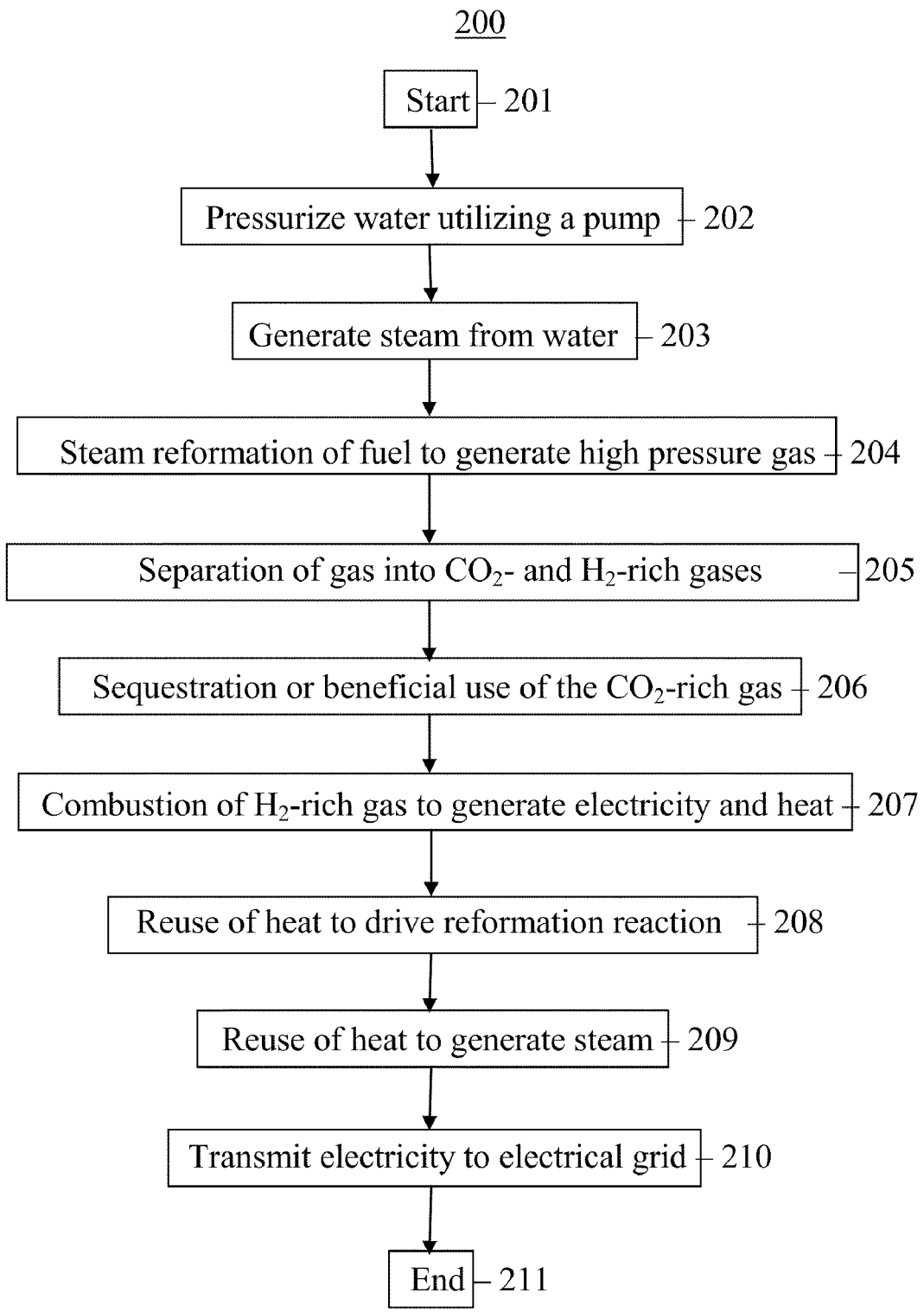
FIG. 2 illustrates an example of operations for reforming super-heated steam and carbonaceous material to create a gas mixture rich in hydrogen and carbon dioxide in which the hydrogen combusts in a gas turbine for electricity generation while the carbon dioxide gas remains stored for sequestration and/or beneficial use.

FIG. 2 illustrates an example of operations 200 that may be performed in order to generate electricity from carbonaceous material with low $CO_2$ emissions. The process begins at operation 201. At operation 202, a pump pressurizes water. At operation 203, steam is generated from the pressurized water, for example, using a boiler. At operation 204, the carbonaceous material is reformed using steam into high pressure gas. At operation 205, a separator separates the high pressure gas into $CO_2$ and $H_2$ rich gases. At operation 206, the carbon dioxide is sequestered and/or used for beneficial purposes. The rest of the driver gas, which may include hydrogen gas, as well as minor amounts of methane, carbon monoxide, as well as other gases, are combusted in order to generate electricity and heat, as shown in operation 207. In one example, operation 207 may include combustion of hydrogen and small amounts of methane, in order to provide energy, for instance, within a gas turbine. At operation 208, heat passes through a heat exchanger to help drive the reformation reaction. The energy generated from the combustion may be used to heat the feedstock to a temperature where the carbonaceous material reacts with water to form a hydrogen and carbon dioxide-rich high pressure gas, as described in operation 204. Note that the energy used to drive the reforming reaction can also be provided from burning a fuel other than hydrogen, or biomass, or from a non-combustible source, for example, solar energy, nuclear energy, wind energy, grid electricity, or hydroelectric power (not shown in FIG. 2). At operation 209, heat from the exiting high pressure gas exchanges heat with the boiler. Some of the heat from the combustion reaction is used to help generate steam in the boiler, as shown in operation 209. Finally, the electricity may be used locally or transmitted to the local grid, as shown in operation 210. The process 200 ends in step 211.

Embodiments of the present invention provide various reformer apparatus subsystems for generating high-pressure gas. In some embodiments, the apparatus utilizes a biomass reforming reaction to generate the high pressure gas and a hydrogen combustion reaction to provide the energy required to reform biomass and generate the high-pressure gas. In addition, the apparatus typically includes heat exchange elements to facilitate heat transfer from the high temperature gas to incoming reformer and/or combustion fuel. The transfer of heat facilitates the reforming reaction and lowers the energy required to complete the driver gas formation. An illustrative embodiment is described in relation to FIG. 3 for separate reformer and combustion reactions, followed by an embodiment described in relation to FIG. 4 for autothermal reforming and production of high-pressure gas by a single reaction chamber.

Although both an indirect (FIG. 3) and an autothermal (FIG. 4) reformer are shown here for completeness, the present invention is best practiced with an indirect reformer (FIG. 3), since in an indirect reformer the high-pressure gas does not have nitrogen from air mixed with the generated hydrogen and carbon dioxide, which aids the separation process (described below).

Indirect Reformer Subsystem

Figure 3:
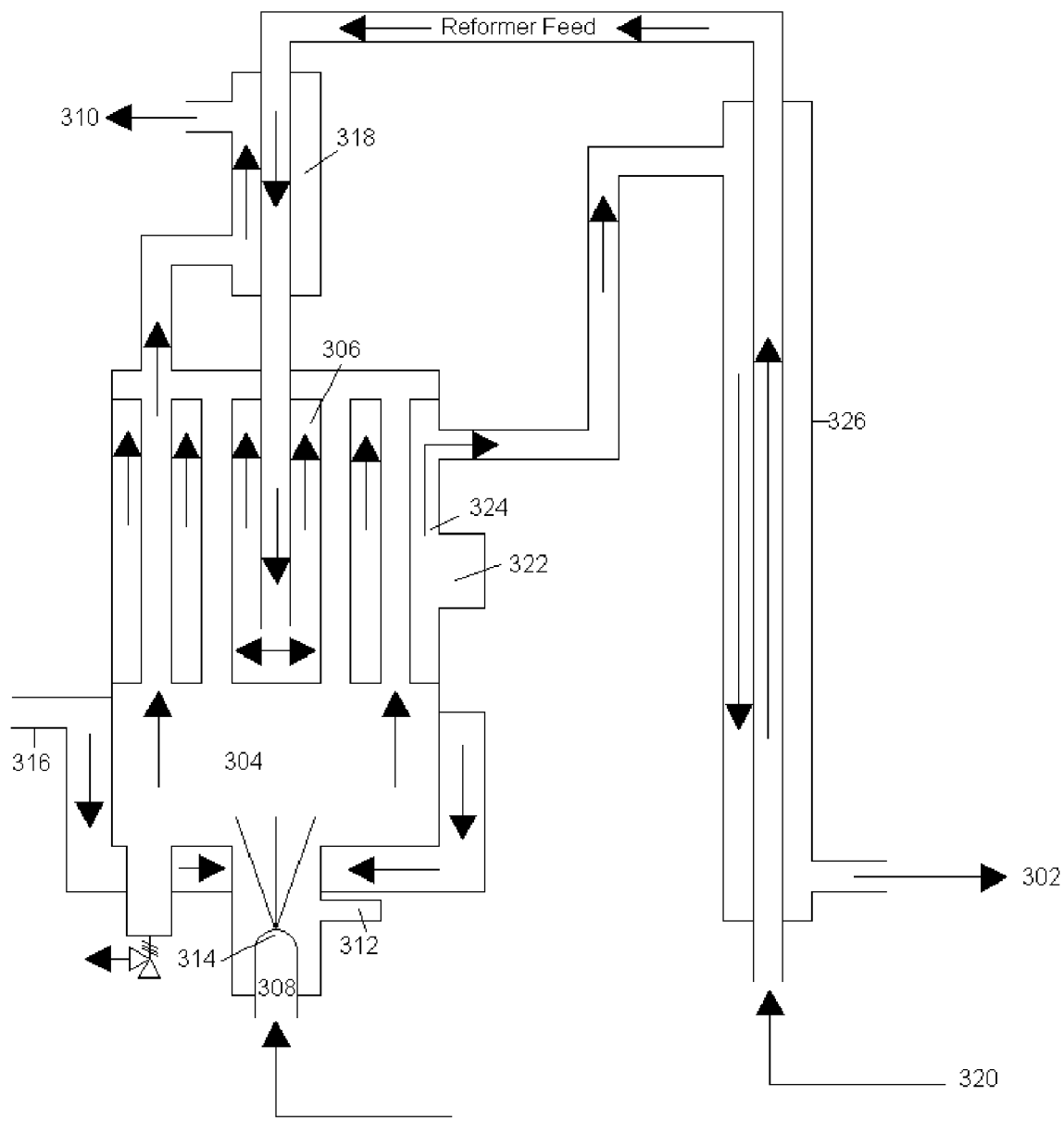
FIG. 3 illustrates an example of an indirect fuel reformer for use with a power plant of the present invention, in accordance with a preferred embodiment of the present invention.

FIG. 3 illustrates an example of a steam reforming apparatus 300 for generating high pressure gas (shown as arrow 302), in accordance with one embodiment of the present invention.

In FIG. 3, an embodiment of the reforming subsystem may include a first storage container (not shown) for storing a combustible material, such as coal, biomass, an alcohol, olefin, or other like material. A second storage container (not shown) may also be provided for storing the carbonaceous fuel for the reforming reaction. The water may be mixed with the carbonaceous fuel in this container to form slurry. Alternatively, a third container (not shown) may be used to store water to be reacted with the feedstock in the reformer chamber.

In one example, a first chamber 304 has an inlet port 316 and an outlet port 310 and is adapted to provide for the combustion of the combustible material. In one example, the first chamber 304 includes an igniter such as a spark plug 312 or other conventional igniter, and a nozzle 314 coupled with the inlet port 316 of the first chamber 304. The inlet port 316 of the first chamber 304 may be coupled with the first storage container (not shown) so that the contents of the first storage container may be introduced into and combusted within the first chamber 304. The first chamber 304 also includes a port 308 for introducing combustion air into the first chamber 304. The first chamber 304 is also adapted to receive a portion of the second chamber 306, described below, so that the energy/heat from the combustion of the combustible material from the first storage container (not shown) within the first chamber 304 is transferred into a portion of the second chamber 306. The outlet port 310 of the first chamber 304, in one example, is near the inlet port 320 of the second chamber 306, and a heat exchanger 318 is used to allow the combustion exhaust gas to heat the carbonaceous fuel and water entering the second chamber 306. Alternatively, the outlet 310 of the first chamber 306 can feed to a heat exchanger located inside the second chamber 306, which thereby allows the combustion exhaust gases produced in the first chamber 304 to provide the heat to drive the reforming reactions in the second chamber 306.

The second chamber 306 has an inlet port (shown as arrow 320) and an outlet port 302. In one example, the inlet port 320 is coupled with the second and third storage containers (not shown) and receives the contents of the second and third storage containers (not shown).

In one example, the second chamber 306 is positioned within the first chamber 304, such that the combustion heat/energy from the first chamber 304 heats the carbonaceous fuel and water sources contained within the second chamber 306 to a point where the carbonaceous fuel reforms into a high-pressure gas which exists out of the outlet port 302 of the second chamber 306. The first and second chambers may be fluidly isolated.

In one embodiment, shown in FIG. 3, the reformer feed entering the inlet port 320 may be a single fluid, for example carbonaceous fuel-water slurry. In other embodiments, not shown in FIG. 3, the carbonaceous fuel and water may be fed into the reformer chamber through separate inlets.

In one example, a first heat exchanger 318 is coupled with the outlet port 310 of the first chamber 304 (the combustion chamber) and is thermodynamically coupled with a portion of the inlet port of the second chamber 306. In this manner, the hot combustion exhaust gases from the first chamber are used to preheat the carbonaceous fuel and water sources as they are being introduced into the second chamber 306 for reformation into a high-pressure gas.

A second heat exchanger 326 may also be utilized, wherein the second heat exchanger 326 is thermodynamically coupled with the outlet port 302 and the inlet port 320 of the second chamber 306, which provides the dual benefit of preheating the carbonaceous fuel and water sources prior to entry into the second chamber 306, as well as cooling the driver gas which is expelled from the outlet port 302 of the second chamber 306.

Notwithstanding the above examples, the present invention does not require the use of heat exchangers. The use of heat exchangers is optional. Heat exchangers may be used to increase the efficiency of the reformer subsystem. However, there may be situations in which heat exchangers would not be used, such as when hot gas is desired and/or when the carbonaceous fuel and water sources are pre-heated by other means.

Autothermal Reformer Subsystem

Figure 4:
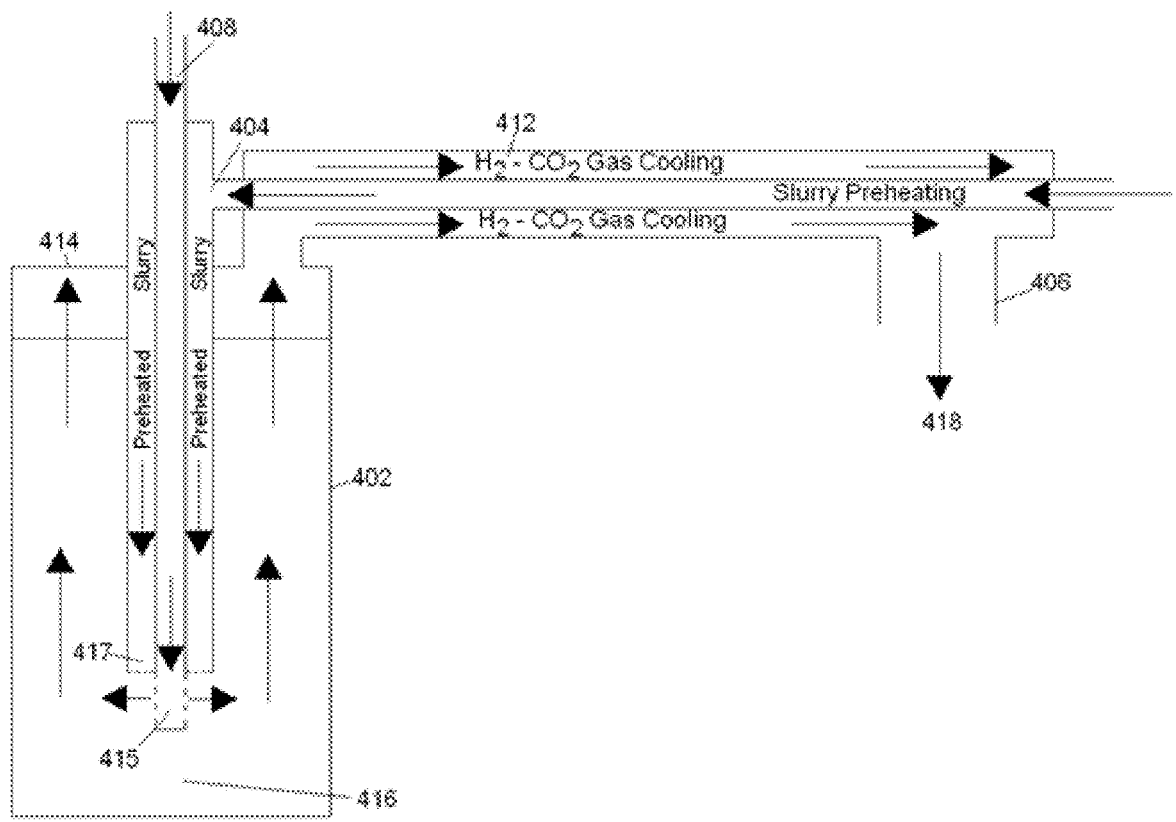
FIG. 4 illustrates an example of an autothermal fuel reformer in accordance with an alternative embodiment of the present invention.

FIG. 4 illustrates another example of a steam reforming subsystem 400 for generating high-pressure gas in accordance with another embodiment of the present invention. The embodiment illustrated in FIG. 4 provides an "autothermal reformer" for the production of high-pressure gas. An autothermal reformer 400 of the present invention directly reacts a carbonaceous fuel source with water as well as oxygen, air, or other oxidizers in a single chamber 402. Embodiments of the reformer provide an environment for reforming carbonaceous fuel from a feed at proper temperature and pressure resulting in the release of high-pressure gas.

Referring to FIG. 4, an autothermal reformer apparatus 400 is shown having a reaction chamber 402, a carbonaceous fuel-water slurry delivery pipe (fuel pipe) 404 for delivery of a mixture of carbonaceous fuel and water, a driver gas outlet port (outlet port) 406 for release of produced high-pressure gas 418, and an oxygen or other oxidizing gas inlet pipe (gas pipe) 408 for delivery of an oxidizing gas used in the combustion of the carbonaceous fuel in the reaction chamber.

Still referring to FIG. 4, the reaction chamber 402 is of sufficient size and shape for autothermal reforming of carbonaceous fuel. Different chamber geometries can be used. In the embodiment shown in FIG. 4, the fuel pipe 404 is coupled to the outlet port 406 to form a counter-exchange heat exchanger 412 so that the energy/heat from the exiting driver gas is transferred to the carbonaceous fuel-water slurry entering the reaction chamber 402 via the fuel pipe 404. In addition, the fuel pipe 404 typically enters at a first or top end 414 of the reaction chamber 402 and releases the fuel toward the second or bottom end 416 of the reaction chamber 402. This configuration enhances heat released from the heated carbonaceous fuel-water slurry into the contents of the reaction chamber 402. Release of fuel into the reaction chamber 402 can be via an outlet 417 or other like device. The gas pipe 408 is typically coupled to or adjacent to the fuel pipe 404 and releases the oxygen or other oxidizing gas adjacent to the release of the carbonaceous fuel-water slurry 415. When in use, the reaction chamber of the autothermal reformer apparatus is typically preheated to a temperature sufficient to start the reforming reaction, i.e., approximately 500° C., and preferably above approximately 800° C. Preheating may be accomplished by a reaction chamber integrated heating element, a heating coil, an external combustor heating system, an internal combustion system, or other like device (not shown).

The carbonaceous fuel and water sources are fed into the reaction chamber 402 via the fuel pipe 404. At approximately the same time that the carbonaceous fuel-water slurry is being delivered to the reaction chamber 402, the oxygen or other oxidizing agent is being delivered to the reaction chamber via the inlet pipe 408. Various reformer chemical reactions are described below.

Once the reforming reaction has been established within the reaction chamber 402, the reaction-chamber heating element may be shut off to conserve energy. Note also that the amount of water combined into the carbonaceous fuel slurry can be adjusted to control the reforming temperatures.

While the example shown in FIG. 4 depicts carbonaceous fuel and water being fed into the reactor together in the form of carbonaceous fuel-water slurry, this is illustrative of only one embodiment. In other embodiments, shown in FIG. 5 and FIG. 6, carbonaceous fuel and water may be fed into the reaction chamber through separate inlets. Also, in other embodiments, not shown, additional combustible material, such as natural gas, oil, charcoal, or any other fuel may be fed into the reaction chamber (in addition to the carbonaceous fuel) in order to facilitate initial system start-up or reactor temperature maintenance. The use of such additional fuel(s) may also be used to provide additional reforming reaction material or to change the hydrogen/carbon dioxide output ratio of the system. All such embodiments are envisioned to be within the scope of the present invention.

Again, although both an indirect (FIG. 3) and an autothermal (FIG. 4) reformer are shown here for completeness, the present invention is best practiced with an indirect reformer (FIG. 3), since in an indirect reformer, the high-pressure gas does not have nitrogen from air mixed with the generated hydrogen and carbon dioxide, which aids the separation process (described below), and does not require the separation of oxygen from air.

Variety of Carbonaceous Fuels

Embodiments of the present invention provide processes for producing high-pressure gas from the reforming of carbonaceous fuel or derivatives of carbonaceous fuel (as described above). Examples of fuel sources that may be used in the reforming reaction include, but are not limited to, biomass, coal, urban and municipal trash, forestry residue, methanol, ethanol, propane, propylene, toluene, octane, diesel, gasoline, crude oil, and natural gas, and in general any carbonaceous (or carbon-containing) compound. A similar subsystem apparatus may be used to reform these fuels.

The present invention provides reforming processes of carbonaceous fuel or carbonaceous fuel-derivatives to generate, for example, $H_2$, $CO_2$, and other gases. The fuel reforming reactions of the present invention are endothermic, requiring an input of energy to drive the reaction toward fuel reformation.

In one embodiment, the energy required to drive the carbonaceous fuel reforming reaction is provided through the combustion of any combustible material, for example, hydrogen, an alcohol, a refined petroleum product, crude petroleum, natural gas, or coal that provides the necessary heat to drive the endothermic steam reforming reaction.

In other embodiments, the energy required to drive the reforming reaction is provided via any non-combustible source sufficient to generate enough heat to drive the reforming reaction to substantial completion. Examples of non-combustible sources include solar, nuclear, wind, grid electricity, or hydroelectric power.

In a preferred embodiment, shown in FIG. 1, a portion of the hydrogen gas generated by the reformer is used in the combustion chamber (furnace) to provide heat for the steam reformer.

Reactions 1-6 above provided illustrative processes for reforming carbonaceous fuel to produce high-pressure gas. Various fuels, such as biomass, coal, alcohols, petroleum, natural gas, etc. may be used as the fuel source for the reforming reaction. Reactions 7-13 illustrate several other reforming reactions using alternative fuel sources that are in accordance with the present invention. The following reactions illustrate a separation of the reforming and combustion reactions; however, as shown in FIG. 4, an autothermal reforming reaction may be accomplished by directly reacting the carbonaceous fuel with oxygen in a single reaction chamber.

| Coal: | $C + 2H_2O = CO_2 + 2H_2$ | (7) |
| Methane: | $CH_4 + 2H_2O = CO_2 + 4H_2$ | (8) |
| Ethanol: | $C_2H_5OH + 3H_2O = 2CO_2 + 6H_2$ | (9) |
| Propane: | $C_3H_8 + 6H_2O = 3CO_2 + 10H_2$ | (10) |
| Propylene: | $C_3H_6 + 6H_2O = 3CO_2 + 9H_2$ | (11) |
| Toluene: | $C_7H_8 + 14H_2O = 7CO_2 + 18H_2$ | (12) |
| Octane: | $C_8H_{18} + 16H_2O = 8CO_2 + 25H_2$ | (13) |

In alternative embodiments, olefins, paraffins, aromatics (as found in crude petroleum), or crude petroleum itself may be used as the reforming reaction fuel source.

Fuel Reformer Subsystem Design Options

The present invention provides for at least three possible carbonaceous fuel-steam reformers, but is not limited to the three carbonaceous fuel reformers described here. These include the fixed-bed reformer (FIG. 5), the fluidized-bed reformer (FIG. 6), and the entrained-flow reformer (not illustrated). The carbonaceous fuel reformers increase in complexity in the order listed. The solids-residue handling requirements also increase in complexity in the same order. However, reaction rates also increase in the same order, leading to reduced equipment sizes for a given throughput. Each carbonaceous fuel-steam reformer may be implemented as an indirect reformer configuration (as shown in FIG. 3), or as an autothermal reformer configuration (as shown in FIG. 4).

Table 1 shows important features that distinguish the three possible carbonaceous fuel-steam reformers. Values are shown to illustrate relative differences in the reformer parameters.

TABLE 1

Operating parameters of various carbonaceous fuel-steam reformers

| Operating Parameter | Fixed-Bed Reformer (FIG. 5) | Fluidized-Bed Reformer (FIG. 6) | Entrained-Flow Reformer (not illustrated) |
|---|---|---|---|
| Feed Particle Size | approx. <1" | approx. <1/4" | approx. <0.1" |
| Temperature | approx. >700° C. | approx. >800° C. | approx. >1,200° C. |
| Solids Retention Time | greatest | intermediate | shortest |
| Gas Retention Time | longest | shorter | shortest |

All three carbonaceous fuel-steam reformers operate at sufficient temperature to eliminate catalyst requirements for steam reforming. The fixed-bed and fluidized-bed reformers are able to accept carbonaceous fuel of the delivered particle size. The entrained-flow reformer would require additional grinding or pulverizing of the carbonaceous fuel after delivery.

Figure 5:
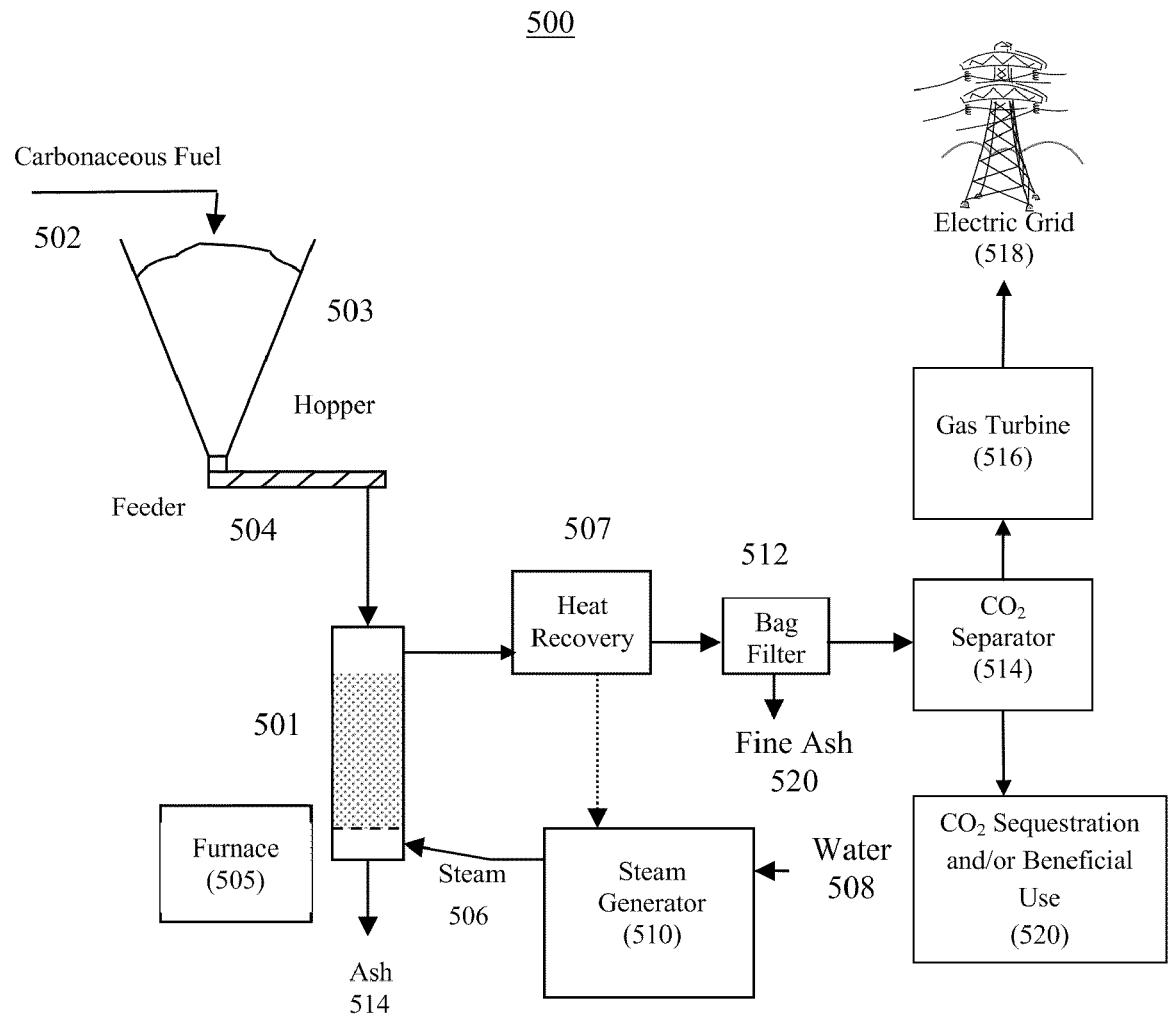
FIG. 5 illustrates an example of a fixed-bed steam reformer for use with a power plant of the present invention in accordance with one embodiment of the present invention.

In one embodiment of the present invention 500, depicted in FIG. 5, a fixed-bed fuel-steam reformer 501 is used to generate high-pressure gas. In the reaction chamber of the fixed-bed reformer, nearly all the feed and residue particles remain in reaction chamber 501 during reforming. Delivered carbonaceous fuel 502 with a feed particle size of approximately less than 1-inch is introduced into hopper 503. The carbonaceous fuel 502 is then fed into fixed-bed reformer 501 through feeder 504. Steam (shown as arrow 506) is also fed into the fixed-bed reformer 501. In one embodiment, heat recovered from the reformer gas is directed into heat recovery unit 507. The heat can be sent to steam generator 510 to convert water (shown as arrow 508) into steam (shown as arrow 506). Furnace 505, which may be fueled by hydrogen and/or carbonaceous material provides the necessary heat to drive the reformer 501.

The fixed-bed reformer can be fed and discharged in batch mode, semi-batch mode (incremental feeding and discharging of ash), or continuous mode. In the fixed-bed reformer, the coarse ash 514 remaining after steam reforming is largely handled in the form of coarser particles that can be removed from the bottom of the reactor. Coarse ash 514 can be considered a byproduct in the system with a clast size greater than 0.063 millimeters. Smaller remaining amounts of ash are entrained in the low velocity exhaust gas exiting the reformer. This fine ash 510 of clast size less than 0.063 millimeters is removed through bag filter 512. The filtered, high-pressure gas is then sent to gas separator 514, which separates the high pressure gas into a fraction rich in $CO_2$ gas, and a fraction rich in $H_2$ (fuel gas). The $CO_2$-rich gas may then be easily sequestered and/or put to beneficial use 520, since it is high-pressure, high-purity $CO_2$. The $H_2$-rich fuel gas, which may also contain minor amounts of methane and carbon monoxide, may then be fed to gas turbine 516, where it is combusted with air to provide electricity to the electric grid 518. Since the $H_2$-rich fuel gas combusts with little or no associated $CO_2$ emissions into the atmosphere, the electricity generated by gas turbine 516 may be considered to be "carbon-free" electricity.

Figure 6:
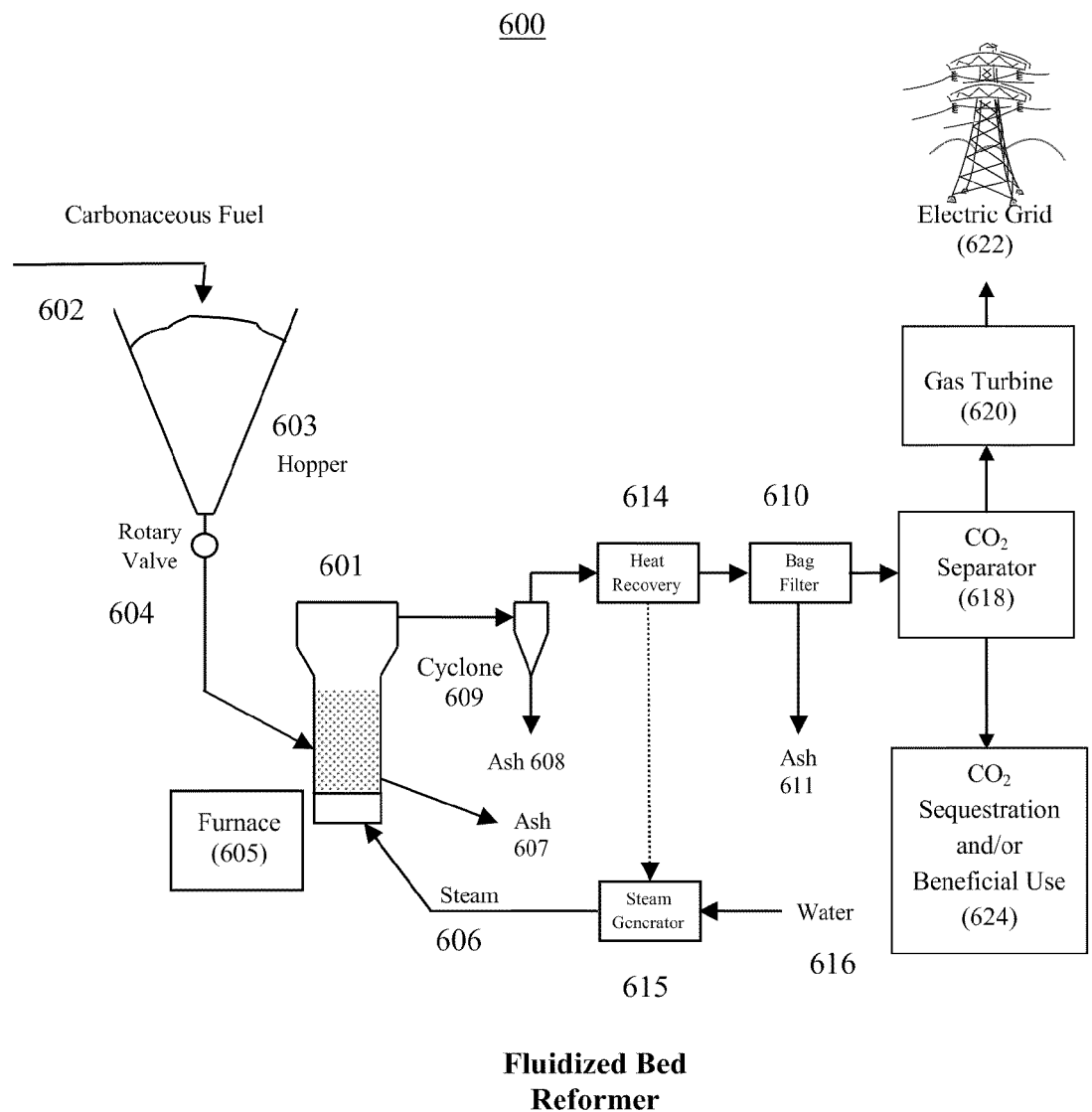
FIG. 6 illustrates an example of a fluidized-bed steam reformer for use with a power plant of the present invention in accordance with an alternative embodiment of the present invention.

In an alternative embodiment 600, depicted in FIG. 6, a fluidized-bed reformer 601 is used to generate high pressure gas. In the fluidized-bed reformer 601, most particles remain in the reaction chamber, but finer particles are entrained with the exhaust gas. That is, compared to the fixed-bed reformer 501 of FIG. 5, greater amounts of fine particles are entrained in the higher velocity exhaust gas (relative to the exhaust gas generated in the fixed-bed reformer) and must be removed prior to compression of the driver gas. The coarsest of the entrained particles are removed from the gas stream and can be recycled to the reformer or discharged as residue. The remaining finest particles are removed by filtration.

FIG. 6 illustrates an example of an embodiment of a system utilizing the fluidized-bed reformer 601. Delivered carbonaceous fuel 602 with a feed particle size of approximately less than ¼-inch is introduced into hopper 603. The carbonaceous fuel is fed into fluidized-bed reformer 601 upon opening of the rotary valve 604. In the fluidized-bed reformer, steam (shown as arrow 606) is also fed into the reaction chamber. Furnace 605, which may be fueled by hydrogen and/or carbonaceous fuel, provides the necessary heat to drive the reformer 601. It is noted that in the fluidized-bed reformer 601, continuous feeding with semi-continuous discharge of coarser ash 607 is preferable. Intermediate ash 608 in exhaust gas exiting the fluidized-bed reformer 601 is removed by cyclone separator 609 (to remove intermediate-sized particles) and bag filter 610 (to remove the finest particles of ash 611). The intermediate-sized particles separated by cyclone 609 can be recycled to the fluidized-bed reformer 601 or removed as residue, depending on the extent of their conversion during reforming. In one embodiment of the fluidized-bed reformer 601, exhaust gas existing cyclone 609 enters heat recovery unit 614. The heat can be sent to steam generator 615 to convert water (shown as arrow 616) into steam (shown as arrow 606). The $CO_2$ separator 618 separates the high pressure gas into a $CO_2$-rich gas and a $H_2$-rich fuel gas. The $CO_2$-rich gas may then be directed for storage via sequestration and/or for beneficial use 624. The $H_2$-rich fuel gas may then be provided to a gas turbine 620. The gas turbine 620 combusts the $H_2$-rich fuel gas with air to generate electricity, using for example a generator (not shown), which electricity is then fed to the electrical grid 622. Since the $H_2$-rich fuel gas combusts with little or no associated $CO_2$ emissions into the atmosphere, the electricity generated by gas turbine 620 may be considered to be "carbon-free" electricity.

In another embodiment of the present invention (not illustrated), an entrained-flow reformer is used rather than a fixed-bed or fluidized-bed reformer. In an entrained-flow reformer, virtually all particles are removed with the exhaust gas steam exiting the reformer. The feed particle size using the entrained-flow reformer is generally less than approximately 0.1-inch. Compared to the fixed-bed and fluidized-bed reformers, the entrained-flow reformer would require additional grinding or pulverizing of the carbonaceous fuel after delivery. Furthermore, with the entrained-flow reformer, the entire feed stream is entrained and removed from the reaction chamber at high velocity. Cyclone and filtration hardware similar to those of the fluidized-bed reformer are used, but removal capacities must be greater.

In other embodiments of the present invention, (not illustrated in FIG. 5 or FIG. 6), carbonaceous fuel-water slurry may be used to provide both carbonaceous fuel and water into the reformer in liquid form via a single feed system, as shown in FIG. 3 and FIG. 4.

In all carbonaceous fuel-steam reformers described, the reformers operate at sufficient temperature to eliminate catalyst requirements for steam reforming. Generally, the fixed-bed reformer may operate at temperatures above approximately 700° C., while the fluidized-bed reformer may operate at temperatures above approximately 800° C. The entrained-flow reformer may operate at temperatures in excess of approximately 1,200° C. These temperature ranges are illustrative only, and are not intended to limit the scope of the present invention. All carbonaceous fuel-steam reformers may operate over temperature ranges other than those temperature ranges disclosed here.

The fixed-bed reformer 501 of FIG. 5 and fluidized bed reformer 601 of FIG. 6 may be designed as illustrated in FIG. 3 or FIG. 4. That is, the steam reforming of carbonaceous fuel can be carried out using an indirect reformer, as in FIG. 3, or a direct ("autothermal") reformer, as depicted in FIG. 4. Indirect reforming requires heat exchange between the heat source ($H_2$ fuel combustion, for example) and the reformer. High pressure gas produced from indirect steam reforming results in greater hydrogen:carbon dioxide ratio than gas produced from direct ("autothermal") reforming. It will be appreciated that the combustible material may be hydrogen ($H_2$), or alternatively may be an alcohol, olefin, natural gas, oil, coal, biomass or other combustible source.

Autothermal reforming eliminates the heat exchange requirement since partial combustion is performed in the reforming reaction chamber to generate heat. Using oxygen for the oxidizer, the autothermal reformer product gas is still a mixture of carbon dioxide and hydrogen, but the hydrogen:carbon dioxide ratio is lower than that for indirect reforming. Using air as the oxidizer, the autothermal reformer product gas is diluted with nitrogen, which may be undesirable in cases where high purity $CO_2$ is required.

Illustrative carbonaceous fuel reformers have been described and shown here. However, the present invention is not limited to these carbonaceous fuel reformer configurations, and other carbonaceous fuel reformers are within the scope of the present invention.

Sulfur Removal

Most carbonaceous fuel has some sulfur. Because steam reforming is performed without catalyst, reforming catalyst poisoning by sulfur compounds is not an issue. In cases where a low-sulfur carbonaceous fuel is used, sulfur clean up of the exhaust gas may not be required at all. In the event of potential issues with corrosion caused by sulfur-containing gases in combination with any residual moisture, several sulfur treatment and removal methods are possible.

Dry sorbents may be used to capture sulfur in the exhaust gas. Calcium oxide, magnesium oxide, and sodium carbonate are example dry sorbents that are capable of trapping sulfur gases in solid form (as sulfates or sulfites, depending on the relative oxidation conditions). When the operating temperature and pressure permit effective sulfur capture, sorbent can be added in a coarse form with the feedstock to fixed- or fluidized-bed reformer configurations. The resulting sulfur-containing product can then be removed from the reaction chamber with the ash remaining after reforming. Alternatively, a finer sorbent can be injected into the gas downstream of the reactor. Sulfur containing solids can then be collected in the cyclone or bag filter. For the entrained-flow reformer configuration, a sorbent will likely perform better by injection into partially cooled gas downstream of the reformer.

In large-capacity reformer configurations, a dry sorbent may be injected in a separate unit downstream of the final ash particulate filter. The sulfur product can then be collected separately in another filter and can potentially be sold as a product for additional revenue.

In other embodiments, sulfur may also be removed by using a wet scrubber sub-system. Wet scrubbers can be configured in venturi, packed-column, or tray-type systems in which the cooled gases are contacted with a scrubbing solution or slurry. The resulting scrubber solution or slurry must then be disposed.

The use of the methanol $CO_2$ separation system described below has the additional benefit of removing sulfur impurities from the $CO_2$ gas stream.

Preferred $CO_2$ Separation Subsystem

According to the present invention, highly economic $CO_2$ and $H_2$ generation system is created. The $CO_2$ and $H_2$ are generated from any carbonaceous fuel source including biomass or coal, a highly economical fuel source and one that is available almost everywhere. The $CO_2$ generated in the present invention may be injected into an oil well for enhanced oil recovery or used for other beneficial purposes. The present invention also generates large supplies of hydrogen, which may be split off from the $CO_2$ product to be used for many purposes, including electrical power generation or petrochemical hydrogenation.

In an alternative embodiment, the hydrogen gas may be sold to the petrochemical or other industry. In the future, it may also be sold as a fuel for hydrogen-electric cars. Alternatively, the hydrogen may be burned, using for example a gas turbine, to generate electricity. The electricity may be sold to utility companies by feeding the electricity into the electric grid.

Carbon dioxide is approximately two orders of magnitude more soluble in methanol than any of methane, hydrogen, nitrogen, oxygen, or carbon monoxide (which all have solubilities of the same order). The methanol also acts as a trap, removing sulfur impurities from the gas stream. In experiments done to date, inventors have shown that at 10 bar pressure and 10° C., methanol will take in to solution about 40 grams per liter of $CO_2$ from a 40% $CO_2$/60% $N_2$ gas mixture, with less than 2 grams/liter of $N_2$ entrained.

Inventors have used this data to create a system where liquid methanol is pumped in a cycle from 1 bar to 10 bar, with the gas mix being bubbled through a column on the 10 bar side, and captured gas allowed to outgas from solution on the 1 bar side. Results to date show that product gas purities of 95% $CO_2$ can be obtained, with 80% of the input $CO_2$ in the feed gas stream being captured into the product stream. The fraction captured could be increased further to better than 95% by heating the methanol in the low pressure tank to 40° C., which could be readily done using low quality waste heat from either the steam reformer or power generation systems. Warming the methanol in this manner would increase the methanol vapor pressure in the exhaust to about 0.3 bar, but nearly all of the entrained methanol vapor could be condensed and removed by running a low-cost (commercial meat freezer technology) −18° C. refrigerator downstream of the exhaust vessel. This unit would also reduce the $CO_2$ temperature to −18° C., which is advantageous, as it allows $CO_2$ gas to be liquefied by subsequent compression to only 20 bar.

However, in order to eliminate the large majority of this compression energy work, reduce methanol recirculation pump work by an order of magnitude, and to obtain both $CO_2$ product recoveries and purities of better than 97%, a preferred system configuration may be used that uses methanol cooled to −60° C. in the absorption column. Such a column can acquire $CO_2$ in the liquid phase, forming mixtures that are more than 30% $CO_2$ by weight, with only insignificant qualities of non-$CO_2$ gases brought into solution. Upon being warmed in the desorption column to 40° C., nearly all the $CO_2$ is stripped, and removed from the system at 10 bar, making subsequent liquefaction very straightforward. In the preferred embodiment, the heating of the methanol occurs at the bottom of the downflowing desorption column, with cold $CO_2$-saturated methanol on top, so that very little methanol vapor escapes with the product $CO_2$.

In the process of liquefaction, nearly pure $CO_2$ is obtained, as neither hydrogen, methane, oxygen, nitrogen, nor carbon monoxide will be liquefied at −60° C. Once the $CO_2$ is liquefied, it can be brought to whatever high pressure is required for underground injection at little energy cost.

The non-$CO_2$ product gases, which will be a mixture of hydrogen, methane, and small amounts of carbon monoxide, is sent directly to a gas turbine where it is burned to produce electricity for sale to the grid.

Alternative $CO_2$ Separation Subsystems

Various alternative techniques may be used to separate hydrogen gas from carbon dioxide gas, in additional to the methanol-$CO_2$ separation technique described above. In one embodiment, hydrogen-carbon dioxide separation may be performed using membranes. The membranes separate molecules based on their relative permeability through various materials that may include polymers, metals, and metal oxides. The membranes are fed at elevated pressure. The permeate is collected at lower pressure while the retentate is collected at a pressure close to the feed pressure.

A membrane separation technique that may operate in conjunction with reactions at elevated temperature is the palladium membrane. This membrane, which may be fabricated using palladium alone or in combination with modifiers, allows only hydrogen to permeate. This type of membrane, when operated in a catalytic reactor, such as in a steam reformer, enhances yield by removing a reaction product from the reaction zone. Some variants are capable of operation at up to 900° C.

Another membrane separation method that may be used is a high-temperature polymer membrane. This type of membrane is directed toward $CO_2$ separation and recovery. A polymeric-metal membrane of this type can operate at up to 370° C. (versus typical maximum polymer membrane temperatures of about 150° C.), thus potentially improving process energy efficiency by eliminating a pre-cooling step.

In yet another embodiment, carbon dioxide may be separated from hydrogen by scrubbing in an amine solution. This technique may be used to remove carbon dioxide (and hydrogen sulfide) from the high-pressure gas.

Finally, in yet another embodiment, regenerable sorbents may be used to separate hydrogen gas from carbon dioxide gas. In one example of a low-cost regenerable sorption method, a sodium carbonate sorbent is used. The sodium carbonate sorbent operates cyclically, by absorbing at about 60° C. and regenerating at about 120° C.

As described in the preferred $CO_2$ separator section, processes that generate high $CO_2$ concentrations are more amenable to affordable gas separation. Elimination of diluents such as nitrogen from air greatly improves $CO_2$ capture efficiency. In addition, processes that produce $CO_2$ at elevated pressure are at an advantage for the pressure-based separation techniques.

Various gas separator modules may be used, and the present invention is not limited to the particular gas separators shown or described herein, so long as the gas separators perform at least the function of separating $CO_2$ from the rest of the driver gas.

System Design Using a Modular Configuration

The present invention may also be configured as a modular system, which may include all or part of the following set of components: a steam reformer, a gas separator, heat exchangers, a power generator, and a control system. These components may be mixed and matched depending on the particular application, and the requirements of a particular user. These components are described in detail throughout this disclosure.

A carbonaceous fuel reformer module is provided that is capable of reacting carbonaceous fuel with water to produce a mixture of $CO_2$ and hydrogen gas, sized to an output rate appropriate for the application. Depending upon the availability and cost of local carbonaceous fuel types, the reformer may be designed to operate with various candidate carbonaceous fuel feed-stocks. The carbonaceous fuel reformer may be designed as a fixed-bed reformer, a fluidized-bed reformer, an entrained-flow reformer, or another design altogether. The carbonaceous fuel reformer may be designed in a direct reforming configuration, or an indirect ("autothermal") reforming configuration. Examples of the design of such carbonaceous fuel reformers are discussed above in relation to FIGS. 3-6.

A set of heat exchangers is provided that are designed to maximize the thermal efficiency of the reformer system. The heat exchangers were discussed above in relation with the fuel reformers of FIGS. 3 and 4.

A gas separator module is provided that is capable of separating the $CO_2$ from the hydrogen gas. Candidate separator systems include methanol temperature and/or pressure swing, sorption beds, $CO_2$ freezers, membranes, and centrifugal separators, as described above.

A power generator module is provided that is capable of utilizing the hydrogen product separated by the gas separator to generate electricity. The power generator may be a gas turbine, an internal combustion engine, a fuel cell system, or any other apparatus or system that can generate power (electrical or mechanical or other) from hydrogen, methane, and/or carbon monoxide gas.

A control module is provided that is capable of controlling the operation of the system both automatically and with user-input. The control module may use subsurface data to automatically regulate the operation of the system via feedback control. This allows the system to operate with minimal human supervision or labor. The subsurface data may include total pressure, partial pressure of carbon dioxide, partial pressure of hydrogen, temperature, and/or viscosity of the oil. The control module may also include a set of controls for user-control of the system.

The control system may be used to control the power plant based on the local prices of electricity, carbonaceous feedstock, water, and the value of the product produced via the beneficial reuse of $CO_2$. That is, if the local price of electricity has increased and/or there is a demand for more power, the control system may divert more of the hydrogen to electricity generation. The opposite condition may hold if the local price of electricity dropped or if the market price of the product produced via the beneficial reuse of $CO_2$ rose; in this case the control system may divert more of the hydrogen gas and $CO_2$ gas for beneficial use. This optimization operation may be performed automatically by a control module based on real-time inputs of market prices and other parameters.

A gas capture module is provided that is capable of re-capturing a portion of the $CO_2$ gas and recycling the gas. The gas capture module allows the $CO_2$ that is released with the oil emerging from the ground to be re-captured and sent via the compressor module underground for reuse. The gas capture module increases the overall efficiency of an oil recovery operation, because a portion of the generated $CO_2$ gas is recycled and reused.

In one embodiment, a gas capture module is created by pumping the oil into a vessel with a certain amount of ullage space above the oil, and drawing suction on the ullage with another pump. This operation will lower the vapor pressure of carbon dioxide above the oil, allowing gases in solution to outgas so that they can be recycled back into the well. Various gas capture modules are within the scope of the present invention, and the present invention is not limited to the particular gas capture modules or methods shown or described here, as long as the gas capture modules or methods are capable of capturing at least a portion of the gas emerging with the oil from the oil well.

Figure 7:
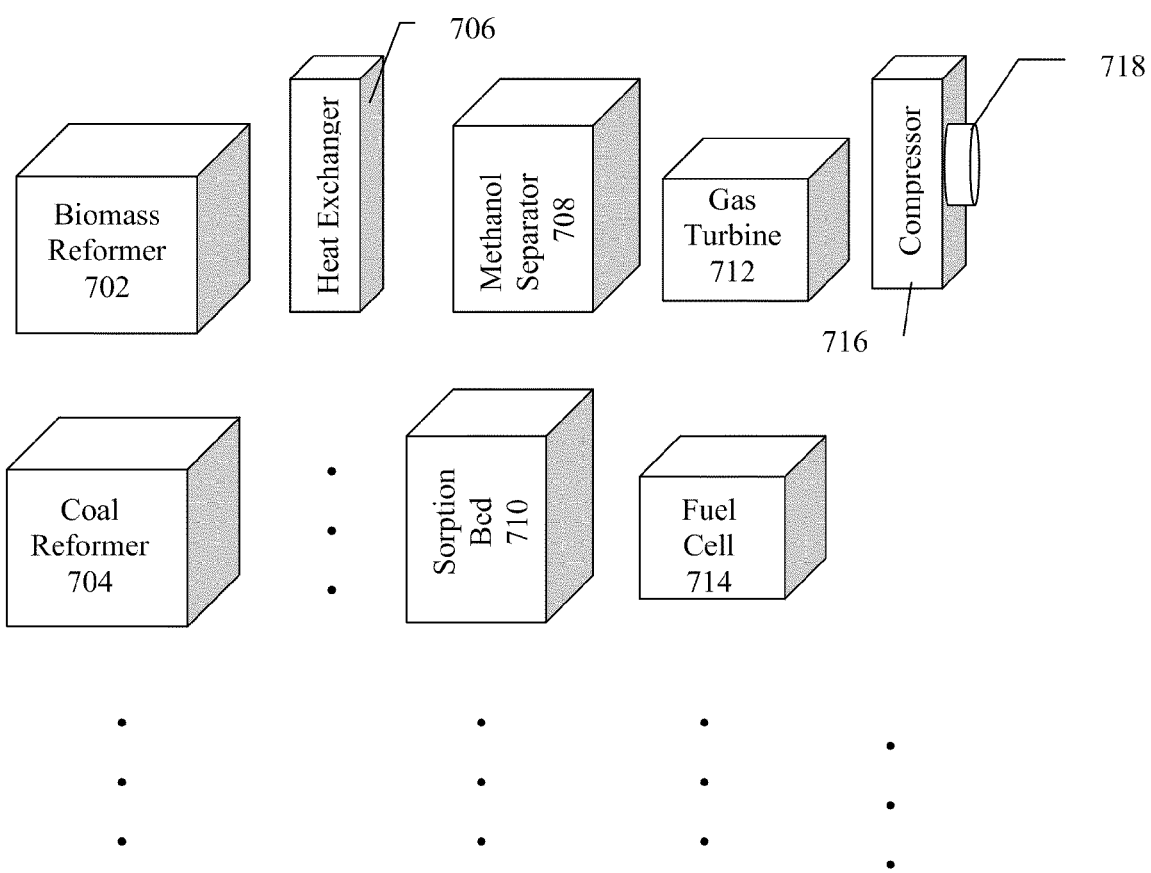
FIG. 7 illustrates an example of a modular power plant according to yet another embodiment using the principles of the present invention.

FIG. 7 illustrates an example of a modular embodiment of the present invention 700 having one or more modules. For example, any of a number of reformer modules may be used. A biomass fuel reformer module 702 and a coal fuel reformer module 704 are shown for illustrative purposes only. Any heat exchange module, such as heat exchanger 706, may be used. Any gas separator module, such as methanol $CO_2$ separator module 708 or sorption bed 710, may be used. Any power generator module, such as gas turbine 712 or fuel cell 714, may be used. Any compressor module, such as compressor

718, may be used if even higher $CO_2$ pressure is required, for example 5,000-10,000 psi for deep EOR or deep saline aquifer injection. High-pressure gas exits the compressor module 716 via port 718.

Power Generation Subsystem

The hydrogen gas separated by the gas separator module may be used to generate power. The power generator module utilizes a portion of the hydrogen gas separated by the gas separator module to generate power. In one embodiment, the power generator module is used to generate electricity. In one embodiment, the electricity is sold to a utility company by feeding the electricity into the electric grid. The power generator module may be a combustion turbine, a steam turbine, a fuel cell, or any other apparatus, system, or module that can generate power (electrical or mechanical or other) from hydrogen gas.

According to one embodiment of the power generator module utilizing a combustion turbine, hydrogen is fed with air to generate power through a rotating shaft. Designs of hydrogen gas turbine plants are described in U.S. Pat. No. 5,755,089 to Vanselow, U.S. Pat. No. 5,687,559 to Sato, and U.S. Pat. No. 5,590,518 to Janes. Designs of hydrogen internal combustion engines are described in U.S. Pat. No. 7,089,907 to Shinagawa et al., U.S. Pat. No. 4,508,064 to Watanabe, and U.S. Pat. No. 3,918,263 to Swingle.

Another embodiment of the power generator module uses a steam turbine. A variety of fuels may be used, including a portion of the separated hydrogen, part of the coal or other feedstock material, or even waste hydrocarbon gases. The fuel is burned in air in a combustion chamber to generate heat. The heat is transferred to a closed-loop steam/water system through a series of heat exchangers designed to recover the combustion heat. The high-pressure steam drives a turbine for power generation. In one embodiment, the combustion turbine and steam turbine may be integrated to boost efficiency (integrated combined cycle).

As an alternative to combustion, in one embodiment of the present invention, a fuel cell module may be used to convert hydrogen directly to electricity, usually with greater efficiency albeit at a higher capital cost. The fuel cell module, an electrochemical energy conversion device, produces electricity from the hydrogen fuel (on the anode side) and oxidant (on the cathode side). The hydrogen and oxidant (which may be ambient oxygen) react in the presence of an electrolyte. The reactants (hydrogen and oxygen) flow in and reaction products (water) flow out, while the electrolyte remains in the cell. The fuel cell can operate virtually continuously as long as the necessary flows of hydrogen and oxidant are maintained. Designs of fuel cell plants are described in U.S. Pat. No. 6,893,755 to Leboe, U.S. Pat. No. 6,653,005 to Muradov, U.S. Pat. No. 6,503,649 to Czajkowski et al., U.S. Pat. No. 6,458,478 to Wang et al., U.S. Pat. No. 5,079,103 to Schramm, U.S. Pat. No. 4,659,634 to Struthers, and U.S. Pat. No. 4,622,275 to Noguchi et al.

Various power generator modules are within the scope of the present invention, and are not limited to the particular power generators shown or described here, so long as the power generators can generate power, whether electrical, mechanical, or other, from hydrogen-rich gas.

Benefits of Biomass Reformation and Other Embodiments

Figure 8:
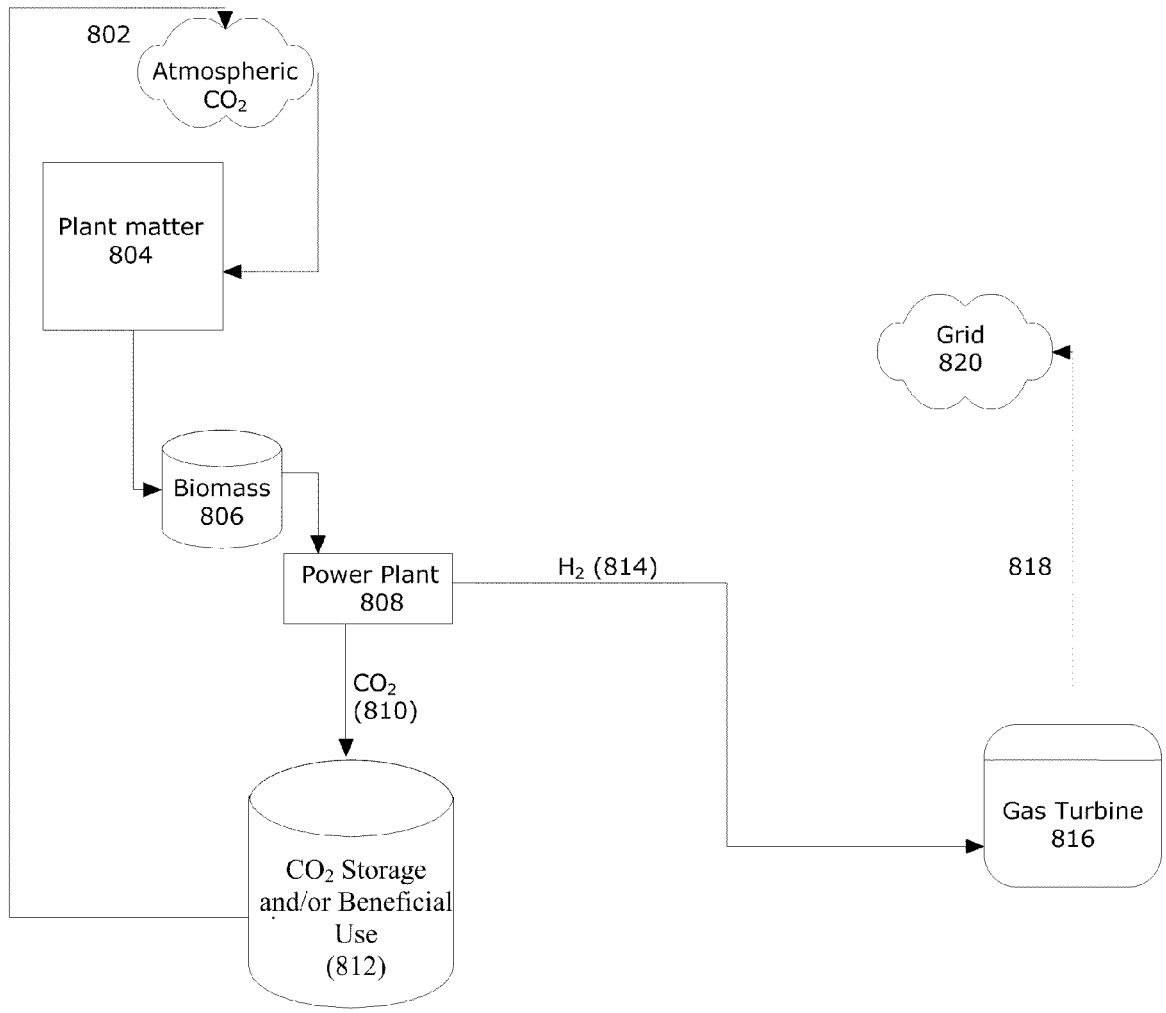
FIG. 8 illustrates yet another example of a power plant of the present invention using biomass as the carbonaceous material in accordance with yet another alternative embodiment of the present invention.

FIG. 8 illustrates a scenario (800) where a power plant operating in proximity to an oil field or other beneficial user of $CO_2$ uses a biomass-steam reforming plant according to the principles of the present invention. In one illustrative example, a plant is built that is capable of generating ten million cubic feet of $CO_2$ a day (or 10,000 kcf or 10 MMcf) and 14,000 kcf (or 14 MMcf) of hydrogen. In this scenario, the $CO_2$ is sequestered underground in the field, generating about 1,000 extra barrels of oil per day while the hydrogen is burned on site to generate approximately 25 MW of emissions-free, electricity which is sold to a local utility grid. In the discussion below, the figure illustrates the amount of $CO_2$ sequestered for each day of operations of such a 25 MW power plant built using the principles of the present invention.

In FIG. 8, atmospheric $CO_2$ is captured by plant matter during the course of the natural carbon cycle (802). The carbon ends up in the plant matter biomass (804), which is harvested for use in the power plant. About 307,000 kg of biomass (806), which contains about 138,000 kg of carbon, is fed into the power plant (808) per day. The power plant (808) generates about 10 MMcf of $CO_2$ per day (810), which is used to extract an extra 1,000 barrels of oil from the oil field per day, or alternatively is used to produce some other beneficial product (812). One barrel of oil contains about 120 kg of carbon, out of which, on average, about 103 kg is released as $CO_2$ when the oil is consumed. Thus, about 103,000 kg would be released if all of the oil was later combusted, for example, in a vehicle during driving. Therefore, about 30% more carbon is sequestered underground (138,000 kg/day) than is released when the oil is ultimately consumed (103,000 kg/day). The hydrogen-rich fuel gas (814) is fed to the gas turbine (816), which generates about 25 MW of electricity (818) that is fed to the electric grid (820).

Therefore, according to one broad aspect of one embodiment of the present invention, both carbon-negative oil and carbon-free electricity may be generated using the principles of the present invention in an economical and financially profitable manner. In fact, using the principles of the present invention, any carbon-intensive industrial process can be turned into a low-carbon intensive process, or even a carbon-negative process, by utilizing the principles taught in the present invention.

Accordingly, another embodiment of the present invention is a hydrocarbon, which when combusted, releases less carbon dioxide than the amount of carbon dioxide sequestered underground during a process of extracting the hydrocarbon.

Yet another embodiment of the present invention is a petroleum product extracted by a process comprising the steps of injecting carbon dioxide into an injection well, and recovering the petroleum product from a production well, where an amount of carbon dioxide injected into the injection well is greater than or equal to an amount of carbon dioxide released into the atmosphere when the petroleum product is combusted.

Yet another embodiment of the present invention is a method for removing carbon dioxide from the atmosphere, and hence helping mitigate global warming, the method comprising the steps of: providing a carbonaceous fuel reaction apparatus; providing carbonaceous fuel for the carbonaceous fuel reaction apparatus; generating carbon dioxide gas from the carbonaceous fuel using the carbonaceous fuel reaction apparatus; and utilizing the carbon dioxide gas in a manner that substantially does not release the carbon dioxide gas into the atmosphere.

Another embodiment of the present invention is the method above, where the carbon dioxide gas is used to grow algae and/or plants in greenhouses. Yet another embodiment of the present invention is the method above, where the carbon dioxide is sequestered underground in a saline aquifer, depleted oil field, depleted gas field, and/or unmineable coal seam. Yet another embodiment of the present invention is the method above, where the carbon dioxide is used for enhanced oil recovery (EOR), enhanced gas recovery, and/or enhanced coal-bed methane recovery. Yet another embodiment includes sequestering the $CO_2$ in the oceans.

Yet another embodiment includes using the $CO_2$ for fuel production.

In yet another alternative embodiment of the present invention, the principles of the present invention may be used to retrofit an existing natural gas-fired power plant to work with biomass and/or coal, while reducing $CO_2$ emissions. Natural gas power plants, especially natural gas combined cycle power plants, are gaining in popularity because of their higher efficiencies and less carbon dioxide emissions as compared to coal-fired power plants. Unfortunately, the price of natural gas is highly volatile, being coupled to the volatility of petroleum prices. Therefore, it would be advantageous to utilize coal and/or biomass as a feedstock in a natural gas combined cycle plant without losing the thermal and environmental efficiencies of a natural gas combined cycle plant. The principles of the present invention may be used to create a high-pressure stream of $H_2$ and a high pressure stream of $CO_2$, which may be easily sequestered or beneficially utilized. The $H_2$ may then be fed into a traditional natural gas-fired combined cycle power plant, hence retrofitting an existing natural gas power plant to run on coal and/or biomass, which is a fuel significantly cheaper than natural gas and without the price volatility. In addition, the $H_2$ burns even cleaner than the original natural gas, and therefore the present invention may be used to retrofit a natural gas power plant to run on hydrogen, while sequestering nearly 100% of the $CO_2$ in the coal and/or biomass used as the fuel source.

As an alternative to using a reforming reaction to generate high pressure gas, it is an alternative embodiment of the present invention to use combustion and/or gasification followed by water-gas-shift reaction to generate the gases, and still be within the spirit and scope of the present invention. In general, a reforming reaction is preferable to using combustion or gasification using air because either reaction would produce driver gas mixed with large amounts of nitrogen from air, which is undesirable. As an alternative to using air-blow combustion or gasification, it is another embodiment of the present invention to use oxygen-blown combustion or gasification, and still be within the spirit and scope of the present invention. In general, a reforming reaction is still preferable to using oxygen-blown combustion or gasification, because in either case, a source of pure oxygen is required, which must be separated from air, introducing an additional expense.

While the methods disclosed herein have been described and shown with reference to particular operations performed in a particular order, it will be understood that these operations may be combined, sub-divided, or re-ordered to form equivalent methods without departing from the teachings of the present invention. Accordingly, unless specifically indicated herein, the order and grouping of the operations is not a limitation of the present invention.

While the present invention has been particularly shown and described with reference to embodiments thereof, it will be understood by those skilled in the art that various other changes in the form and details may be made without departing from the spirit and scope of the present invention.

What is claimed is:

1. An apparatus for generating electricity from carbonaceous material having substantially low carbon dioxide emissions, comprising:
   a boiler to boil water to generate steam;
   a steam reformer to react the carbonaceous material with the steam at high-pressure in an absence of air to generate a high-pressure gas comprising primarily carbon dioxide gas and hydrogen gas, wherein sufficient water is provided to ensure a substantial majority of the carbonaceous material is converted into carbon dioxide gas and hydrogen gas;
   a heat exchanger after the steam reformer to exchanger heat from hot gas exiting the stream reformer to boil water into the stream;
   a $CO_2$ separator to separate at high pressure at least a portion of the carbon dioxide gas from the high-pressure gas to generate a carbon dioxide-rich gas and a hydrogen-rich fuel gas; and
   a gas turbine to utilize a portion of the hydrogen-rich fuel gas to generate electricity, wherein waste heat from the gas turbine is used to provide heat needed to boil water in the boiler, and
   wherein the carbon dioxide-rich gas is utilized in an industrial process, thereby generating electricity with substantially low carbon dioxide emissions.

2. The apparatus of claim 1, wherein the carbonaceous material is selected from the group consisting of coal, biomass, natural gas, crude petroleum, ethanol, methanol, and trash.

3. The apparatus of claim 1, wherein the electricity generated has substantially less associated carbon dioxide emissions than electricity generated from combustion of natural gas.

4. The apparatus of claim 1, wherein an amount of carbon dioxide released in the industrial process is less than an amount of carbon dioxide utilized in the industrial process.

5. The apparatus of claim 1, wherein the high-pressure gas further comprises residual carbon monoxide, and wherein the apparatus further comprises:
   a water gas-shift reactor disposed downstream of the steam reformer for converting the residual carbon monoxide into additional carbon dioxide gas and additional hydrogen gas.

6. The apparatus of claim 1, wherein the high-pressure gas further comprises residual carbon monoxide, and wherein the apparatus further comprises:
   a methanation reactor disposed downstream of the steam reformer for converting the residual carbon monoxide into methane.

7. The apparatus of claim 1, further comprising:
   a furnace to utilize a portion of the hydrogen-rich fuel gas to generate heat necessary to drive the steam reformer.

8. The apparatus of claim 7, further comprising:
   a second heat exchanger disposed between the boiler and the furnace to exchange heat between the hot gas exiting the furnace and the steam generated by the boiler.

9. The apparatus of claim 1, further comprising:
   a condenser disposed after the heat exchanger adapted to condense and cool high-pressure gas before entering the CO2 separator.

10. The apparatus of claim 1, further comprising:
    a compressor to compress the carbon dioxide-rich gas to a pressure appropriate for injection into a petroleum reservoir to extract hydrocarbons.

11. The apparatus of claim 1, wherein the steam reformer operates at a pressure of approximately 5 bar to 100 bar.

12. The apparatus of claim 1, wherein the $CO_2$ separator is a methanol-based separator.

13. The apparatus of claim 12, wherein the methanol-based separator operates in a temperature-swing cycle between approximately $-60°$ C. and $+40°$ C.

14. The apparatus of claim 1, further comprising:
    a control system to control an operation of the apparatus based on a market price of the carbonaceous material, a market price of electricity, and a market price of a product of the industrial process.

15. The apparatus of claim 1, wherein the steam reformer is selected from the group consisting of a fixed bed reformer, a fluidized bed reformer, and an entrained-flow reformer.

16. The apparatus of claim 1, wherein the industrial process is fuel production.

17. The apparatus of claim 1, wherein the industrial process is growing algae growing plants in greenhouses.

18. The apparatus of claim 1, wherein the industrial process is carbon sequestration in a location selected from the group consisting of saline aquifer, depleted oil field, depleted gas field, unmineable coal seam, and the ocean.

19. The apparatus of claim 1, wherein the industrial process is enhanced oil recovery (EOR).

20. The apparatus of claim 1, wherein the industrial process is enhanced gas recovery.

* * * * *